United States Patent [19]

Stodt et al.

[11] 4,279,557
[45] Jul. 21, 1981

[54] APPARATUS FOR LOADING BALES ON TO TRANSPORT VEHICLES

[75] Inventors: Eberhard Stodt, Düsseldorf; Erwin Kaldenbach, Ratingen, both of Fed. Rep. of Germany

[73] Assignee: Lindemann Maschinenfabrik GmbH, Düsseldorf, Fed. Rep. of Germany

[21] Appl. No.: 110,464

[22] Filed: Jan. 8, 1980

Related U.S. Application Data

[62] Division of Ser. No. 952,841, Oct. 19, 1978.

[30] Foreign Application Priority Data

Dec. 2, 1977 [DE]  Fed. Rep. of Germany ....... 2753720

[51] Int. Cl.³ .............................................. B65G 67/14
[52] U.S. Cl. .................................... 414/400; 198/418; 198/436; 414/110
[58] Field of Search ................. 414/44, 110, 111, 398, 414/400; 100/188 R, 218; 198/418, 434, 436

[56] References Cited

U.S. PATENT DOCUMENTS

| 3,625,374 | 12/1971 | Hemphill | 414/44 |
| 3,780,893 | 12/1973 | Lassig et al. | 414/400 X |
| 4,182,442 | 1/1980 | Jones | 198/434 X |

*Primary Examiner*—Robert G. Sheridan

[57] ABSTRACT

A method of loading bales of refuse from a horizontally acting baling press on to a transport vehicle without the use of a separate loading machine such as a fork-lift truck comprises aligning the transport vehicle with a discharge from the press; moving each bale as it is discharged from the press on to a transverse table; moving some of the bales laterally so that the bales are formed into two or more rows side by side aligned with the transport vehicle and moving the two rows of bales progressively forwards as successive bales are discharged from the press so that the rows are moved from the transverse table on to the vehicle and the rows are built up on the vehicle until the vehicle is fully loaded. The apparatus for carrying out this method comprises a discharge table arranged at the outlet of the press, a transverse table aligned with the discharge table and on the side of the discharge table remote from the press, the transverse table having a drive by which it is horizontally displaceable across the direction of discharge of the bales from the press and a longitudinally movable hauling tongs which is arranged to move single bales forwards from the discharge table on to the transverse table and then to move the two or more rows of bales which are assembled from the transverse table forwards on to the transport vehicle.

3 Claims, 20 Drawing Figures

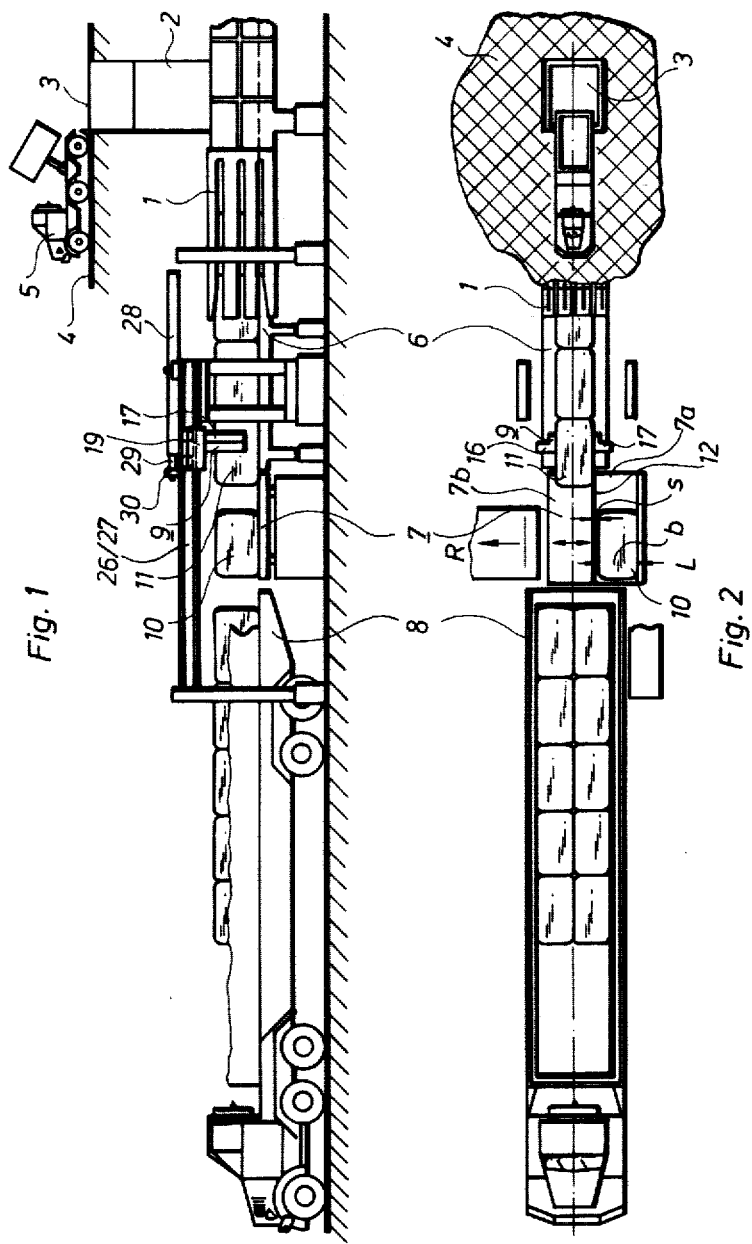

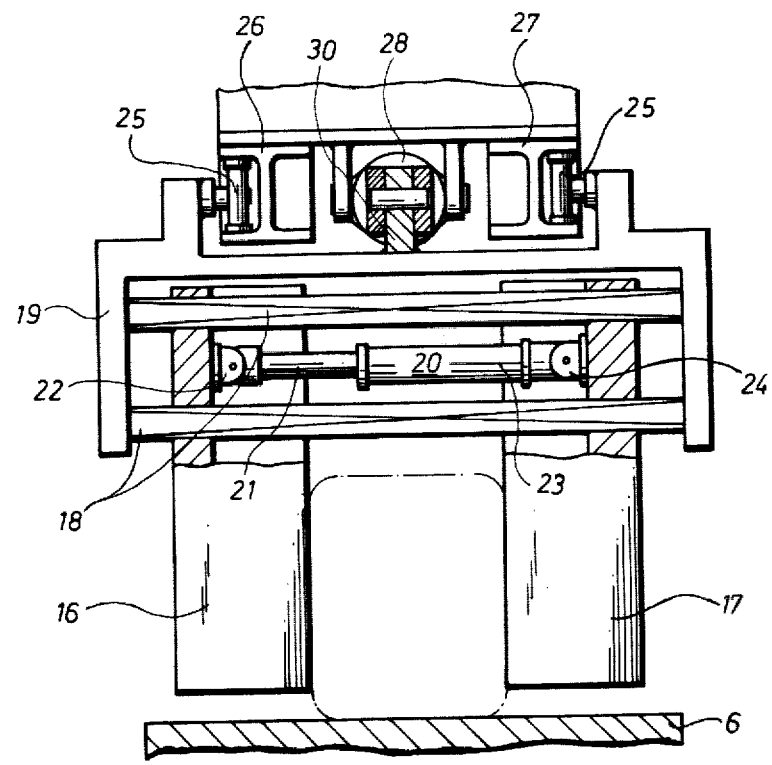

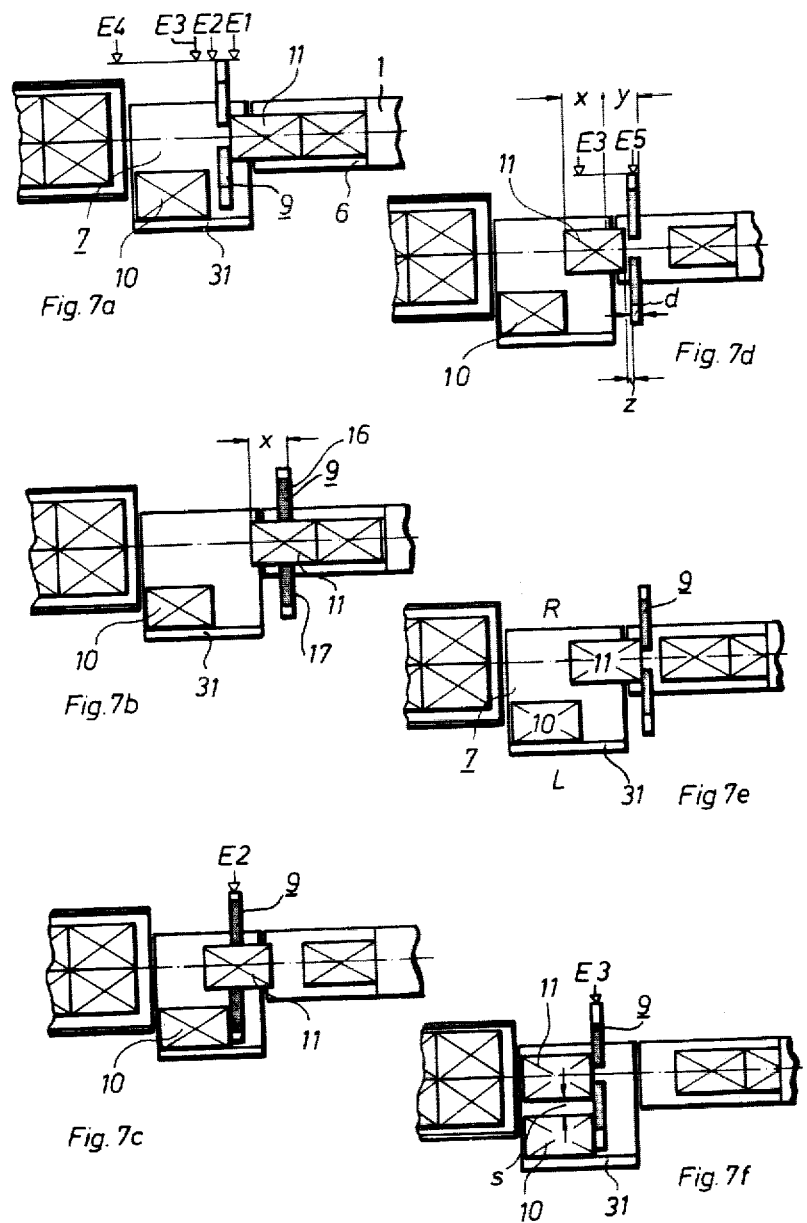

APPARATUS FOR LOADING BALES ON TO TRANSPORT VEHICLES

This is a division of application Ser. No. 952,841 filed Oct. 19, 1978.

This invention relates to methods of and apparatus for loading on to transport vehicles bales of waste material, for example refuse, which have been ejected from a horizontally acting baling press.

Such handling of bales is necessary, for example, in the course of civic refuse disposal, wherein refuse collected by public waste collection vehicles is pressed into highly compacted bales, to enable the refuse to be transported in a rational manner over long distances to a dump and there to be stored in a space-saving manner.

Hitherto, the bound bales ejected from baling presses have been received by a fork-lift truck and loaded in the desired order on to a transport vehicle. Such bale loading is, however, not optimum particularly for economic reasons, since the speed of loading is dependent not directly upon the speed of ejection of the bales from the baling press but upon the loading capacity of the fork-lift truck driven by an operator, so that the loading varies in its speed and is not always uniformly carried out with regard to positioning of the bales on the vehicle. Apart from the fact that the entire loading area of the vehicle cannot be covered by one fork-lift truck, this operation requires of the operator continuous and undivided attention and constant adaptation to the working cycle determined by the speed of delivery of the bales from the baling press.

The aim of the present invention is to provide a method of and apparatus for, as far as possible, automatically loading bales produced in a continuously operating baling press on to a transport vehicle, wherein only bales suitable for transport and storage at a dump, that is undamaged bales of stable form, reach the transport vehicle and the loading operation does not need to be interrupted until the entire length and width of the load deck of the transport vehicle have been filled by a whole number of bales, without any necessity for intermediate movements of the vehicle being loaded.

To this end, according to this invention, in a method of loading onto a transport vehicle bales of waste material which have been ejected from a horizontally acting baling press:

(a) the transport vehicle is positioned with its vertical longitudinal central plane substantially in alignment with the vertical central plane of the discharge of the baling press and a first of a row of bales which are ejected in succession from the press, upon reaching a preliminary position is conveyed from the row individually in the direction in which the bales are ejected;

(b) the first bale is then moved further in the direction of ejection to a first predetermined limiting position;

(c) the first bale is then moved perpendicularly to the direction of ejection horizontally by a distance exceeding the width of the bale;

(d) next the succeeding bale upon reaching a preliminary position is separated from the row and is moved in the direction of ejection as far as the first predetermined position;

(e) thereupon the two bales are together moved back perpendicularly to the central plane of the discharge of the press into a position symmetrical with respect to the vertical central plane of the discharge of the press, the gap previously existing between the adjacent sides of the bales thus being eliminated;

(f) the two bales are together moved forwards in the direction of ejection on to the transport vehicle, the two bales moving a distance exceeding one bale length; and, (g) the foregoing sequence of operations is repeated with further pairs of bales until the vehicle is fully loaded.

With this method, the loading operation takes place surprisingly simply and considerable advantages accrue. In particular, the sequence of operations which can be automatic can be supervised simultaneously by the operator of the baling press, and the use of a fork-lift truck with the accompanying aforementioned disadvantages is eliminated. Thus the loading operation can be carried out more speedily and be more harmoniously adapted to the operation of the baling press. Moreover, this method ensures a multi-row loading of the transport vehicle without difficult and repeated alignment operations. The method steps can of course be modified in such a way that if necessary three or more rows of bales are formed alongside one another on the transport vehicle. This will depend upon the width of the bales and the width of the loading deck of the vehicle.

The invention makes it possible, during steps (a) and (b) of the method for the length of each bale to be determined by means of the displacements necessary during these steps. For this purpose in a preferred form of the method, the length of each bale in each row of bales formed on the vehicle is determined during the movement of the bale in steps (a) and (b) as the sum of the distances travelled by a device which effects the movement of the bale in steps (a) and (b) without touching the bale. The termination of the loading operation is then effected from a comparison between the sum of the bale lengths of the longer or longest row of bales and the load deck length of the transport vehicle.

In order that the automatic loading operation shall not be disrupted by inadequately pressed, damaged or incorrectly bound bales, an additional method step may with advantage be provided. In this step, the bales are visually checked for damage during step (a) and a damaged bale is, after the completion of step (b), separated from the row of bales ejected from the press by movement of the damaged bale in a direction opposite to the direction of the movement of the bales which takes place in step (c).

The invention also consists, according to another of its aspects, in apparatus for carrying out the method in accordance with the invention, the apparatus being arranged to be disposed at an ejection outlet of the press and comprising, located in succession, a discharge table, a transverse table having drive by which it is horizontally displaceable perpendicularly to a vertical central plane of the outlet, and a longitudinally movable hauling tongs disposed symmetrically about the central vertical plane and arranged for the longitudinal conveyance selectively of a single bale and a row of bales, one in front of the other, from the discharge table on to the transverse table and also a pair of bales side by side and two rows of bales side by side from the transverse table on to a vehicle.

With apparatus constructed in this way, completely automatic loading of the vehicle is possible, and indeed in spite of the fact that the apparatus may be quite narrow and of much the same width as the baling press, a two-row or multi-row loading of the vehicle aligned with the baling press is possible, without the need to move the vehicle during loading. As a result of the narrow construction and the resultant comparatively small space demand, the apparatus of the present invention can be installed without difficulty even in already existing refuse disposal plants or the like. The apparatus in accordance with the invention does not of course exclude single-row loading of the transport vehicle, for example with those bales the width of which is equal to that of the loading deck of the vehicle.

The hauling tongs, which serve initially in step (a) of the method for singling out one bale from the row of bales ejected by the baling press and next for further pushing the bale in method step (b), preferably comprises two upright, preferably suspended, synchronously driven jaws, the horizontal spacing of which can be varied by a driving mechanism between a dimension exceeding one bale width and a dimension less than one bale width. This form of construction permits the tongs to be used both for individually gripping the bales and also for pushing them individually or together.

In a preferred example of the apparatus, the transverse table is divided into two half-tables situated alongside one another transversely to the direction of movement of the tongs, the half-tables being connected together by a hinge joint, one half-table being movable on a track which has a horizontal section in which the one half-table moves into a first position in which it is in alignment with the discharge table and a second position in which the other half-table is in alignment with the discharge table, the track also having an inclined section on which the one half-table moves in travelling beyond the second position from the first position to tilt the one half-table and discharge a bale from it. As a result of this form of construction, it is possible when necessary, and in particular during process step (a), to push bales, which have been identified as not suitable for transporting and dumping, on to the half-table having an inclined track section, and to remove these bales sideways by tilting this half-table downwards.

An example of a method and of apparatus in accordance with the invention will now be described with reference to the accompanying drawings, in which:

FIG. 1 is a diagrammatic side view of the apparatus and of a vehicle being loaded;

FIG. 2 is a plan of the apparatus and vehicle;

FIG. 5 is a partly sectional side view of hauling tongs forming part of the apparatus viewed counter to the direction of pressing;

Figure 3:
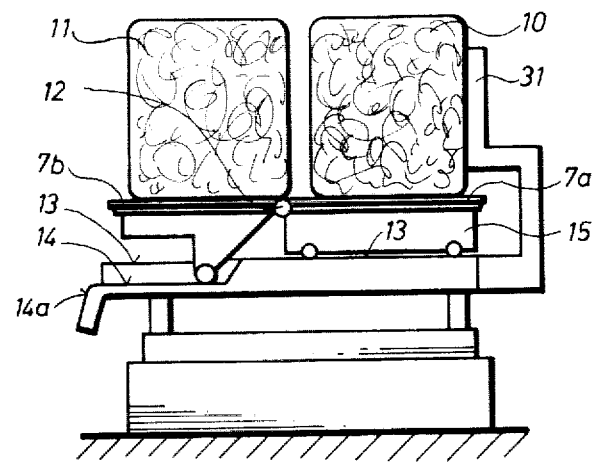
FIG. 3 is a side view of a transverse table forming part of the apparatus viewed counter to the direction in which the bales are pressed.

A horizontal baling press 1 has a filler shaft 2 with a feed opening 3 in the same plane as a dumping platform 4 disposed above the baling press. From the dumping platform 4, refuse vehicles 5, for example, tip refuse into the feed opening 3 of the filler shaft 2. The baling press itself is conventional and is constructed to produce highly compacted and bound rectangular bales, which are pressed and then discharged in a horizontal direction. The bales which leave the press continuously in rows one behind another, pass successively first on to a discharge table 6, then on to a transverse table 7, which consists of half-tables 7a and 7b. The bales are then pushed in pairs on to a transport vehicle 8 in such a manner that two rows of bales are formed alongside one another on the vehicle. From the end of the discharge table 6, a hauling tongs 9 takes over the conveyance of the bales on to the vehicle.

Figure 4:
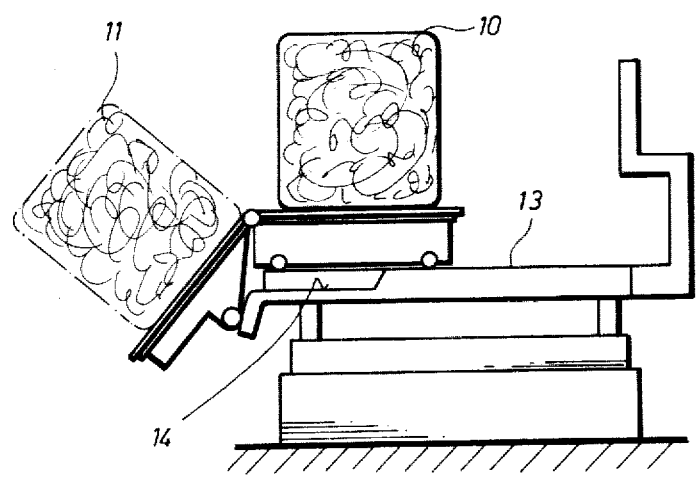
FIG. 4 is a view similar to FIG. 3, but at a later stage of operation.

In the stage of operation according to FIGS. 1 and 2, a first bale 10 of the pair of bales which are both to be pushed simultaneously on to the vehicle is already situated on the transverse table 7 which, as shown in FIG. 2, has been moved with the bale 10 perpendicularly to the direction of pressing of the baling press towards the left side L, as viewed in the pressing and conveying direction, by a distance b+s horizontally, where b is one bale width. As shown in FIG. 2, the half-table 7b has thus come into alignment with the discharge table 6 for the purpose of receiving a second bale 11. In a further stage of operation according to FIG. 3, the second bale 11 is then also situated on the transverse table 7. The half-tables 7a and 7b are connected together by a hinge joint 12, so that by tilting the half-table 7b about the horizontal connecting axis as shown in FIG. 4, a bale which is identified as useless while it is still on the discharge table 6 can be dumped towards the right side R (as considered in the direction of pressing) of the transverse table. Thus it is separated out from the loading operation. For this purpose, the half-tables 7a and 7b are mounted to travel on tracks 13 and 14 of different gauges, and possess different track configurations. The track 13 runs exclusively horizontally, whereas the track 14 changes, laterally beyond the position of the half-table 7b in which the half-table 7b receives a bale from the discharge table, from a horizontal track section into a steeply downwardly inclined track section 14a. This effects the tilting operation when the wheels of the half-table 7b reach the inclined track section. When there is a defective bale 10, (the bale 10 being always the first of a pair of bales to arrive on the transverse table) the transverse table does not adopt as is usual the position shown in FIG. 6a, but is previously displaced as an exception into the position shown in FIG. 7a, so that the bale 10 arrives in this case on the tiltable half-table 7b. The drive of the transverse table 7 is not shown, for simplicity. It can, for instance, consist of a drive motor housed in the lower structure 15 of the half-table 7a or of a hydraulic cylinder attached to the half-table 7a.

The hauling tongs 9, which effects the longitudinal conveyance of the bales from the end of the discharge table 6 onwards as far as the transport vehicle, comprises, as shown in FIG. 5, two vertically disposed jaws 16, 17, which are displaceable along but non-rotatable on, rods 18, which are fixed at both ends into a crossbeam 19. Between the jaws 16, 17, a hydraulic drive 20 is disposed, a piston rod 21 of which is attached by a cross-head connection 22 to the jaw 16 and a cylinder 23 of which is attached by a cross-head connection 24 to the jaw 17, so that the jaws, when the hydraulic drive is extended, are moved apart, and vice versa. Symmetry of movement of the jaws 16, 17 can be achieved in a known manner, not shown, by means of a parallel motion linkage connecting the jaws together. The crossbeam 19 is mounted to travel on track wheels 25 in stationary, upper rails 26, 27 extending in the direction of pressing. The beam 19 is driven by a hydraulic drive 28, which is stationarily anchored between the upper rails 26, 27, and a piston rod 29 of which is connected by a cross-head connection 30 to the cross-beam 19 (see also FIG. 1). As shown in FIG. 5, the jaws 16, 17 have just seized and clamped between them a bale, shown in chain-dotted lines, for the purpose of singling it out from the row of bales ejected from the baling press, the internal spacing between the jaws 16, 17, determined by the pressing pressure, being smaller than one bale width b. For carrying out the method according to this invention, it is of advantage for the internal spacing between the jaws 16 and 17 to be variable between about 0.5 b and 1.3 b, as can be seen from the sequence of operations described below.

Figure 6A:
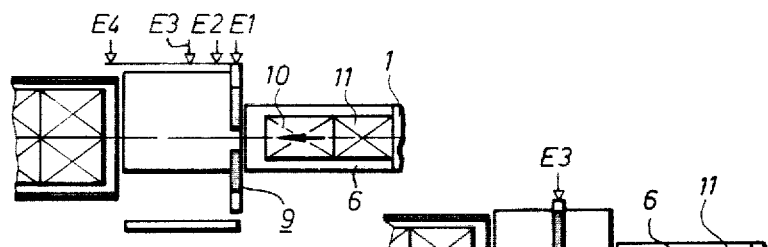
FIGS. 6a–6f are a diagrammatic sequence of the displacing of a first bale on to the transverse table; and, FIGS. 7a–7a are a diagrammatic sequence of the displacing of a second bale on to the transverse table and of the displacing of both the first and second bales on to the transport vehicle.
Figure 6D:
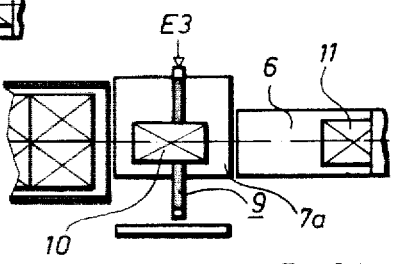
Figure 6B:
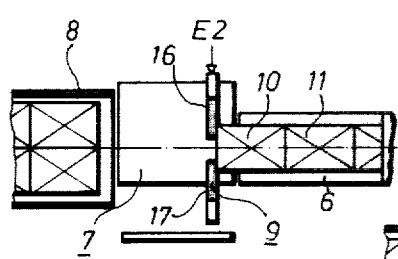

According to FIG. 6a, the hauling tongs 9, controlled by a limit switch E1, are situated immediately downstream, in the direction of conveyance, of the discharge table 6. A first bale 10, resting on the discharge table, will come into contact with the jaws of the hauling tongs only after a further pressing stroke of the baling press, and will push the tongs forwards until the end of the further pressing stroke. Thus the tongs, acting through the limit switch E1 or at latest through the limit switch E2 (FIG. 6b), under certain conditions mentioned below, will initiate the start of a working cycle of the hauling tongs 9. As a rule, the length of one pressing stroke of the baling press, that is the distance by which the row of bales is advanced at each stroke of the press, will be only slightly longer than the distance shown in FIG. 6a between the forward end face of the bale 10 and the hauling tongs 9. Only if the pressing stroke which triggers the working cycle of the hauling tongs is, for example, on account of the presence in the press of large pieces of non-compactable material, so large that the hauling tongs reaches the limit switch E2 (see FIG. 6b) does this limit switch temporarily arrest the baling press. Starting from the thus reached intermediate position, the hauling tongs 9 opens sufficiently far for the internal distance between the jaws 16 and 17 to be approximately equal to 1.3 times the width of a bale. The tongs then travel backwards as shown in FIG. 6c by a distance x, which corresponds to a whole number of control pulses which are summed in a length counter. The jaws 16, 17 then press firmly on to the bale 10 as shown in FIG. 6c, after which the hauling tongs pull the bale 10 as shown in FIG. 6d as far as the half-table 7a of the transverse table 7, that is opposite to the limit switch E3.

Figure 6E:
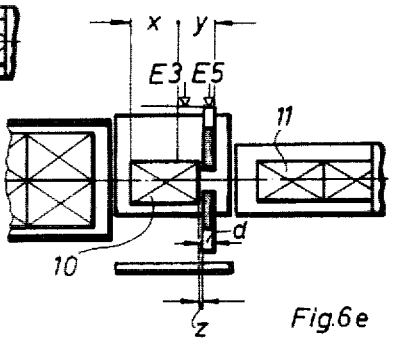
Figure 6C:
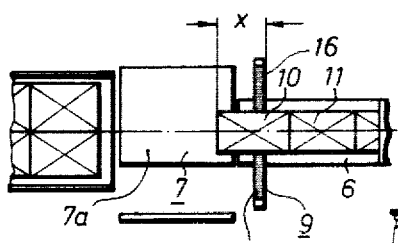
Figure 6F:
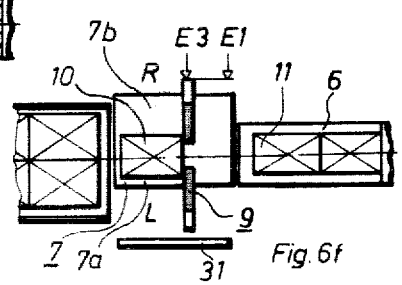

In FIG. 6e, the hauling tongs have released the bale and have travelled backwards by a distance y, which is also determined by the length counter corresponding to the limit switch position E5. This is to a position somewhat behind the bale, and the jaws have approached one another to an internal spacing of about 0.5 times a bale width, so that they can act as a pusher. Next, the hauling tongs travel so closely up to the rear face of the bale 10 that any still projecting parts are pressed into the bale or folded down on to it. In doing this, the hauling tongs travel a distance z, without pushing the bale forwards. Allowing for the thickness d of the jaws 16, 17, a bale length thus amounts to $x+y-(d+z)$. This results in separately summed for the two rows of bales to be formed on the transport vehicle in a counting device which records the corresponding impulses of the control, and the loading operation is automatically terminated when the still free length on the load deck of the transport vehicle 8 is smaller than one bale length of the maximum size produced by the press. It is also possible to proceed in such a way that the lengths of a pair of bales 10, 11 are compared one with another and only the larger bale length is recorded in a single addition for the purpose of monitoring the loading state of the transport vehicle. A somewhat less accurate picture of the loading state is obtained in this way, but it can be done with only a single counting device. Finally, the hauling tongs 9 pushes the bale 10 as shown in FIG. 6f as far as the end of the transverse table 7 which is nearest to the transport vehicle and then travels back into the limit switch position E1. During this movement, the transverse table 7 is moved towards the side L by the distance $b+s$ (FIG. 2), the bale 10 just coming to bear against a stationary stop 31. In this situation, the half-table 7b is aligned with the discharge table 6.

Meanwhile, as shown in FIG. 7a, a second bale 11 has come into contact with the hauling tongs and has passed the limit switch position E1, so that the hauling tongs travel backwards into the position shown in FIG. 7b. The control operations which take place correspond to those already described in connection with FIG. 6c. Following this, the hauling tongs travel as shown in FIG. 7c with the bale 11 into the limit switch position E2, in which, even if the length of the bale 10 previously placed upon the transverse table 7 was a maximum, contact still cannot quite occur between the hauling tongs and the bale 10.

As shown in FIGS. 7d–7f, the sequence of operations already described in connection with FIGS. 6e and 6f is now repeated, so that the bale 11 comes to rest at a distance s alongside the bale 10.

Figure 7G:
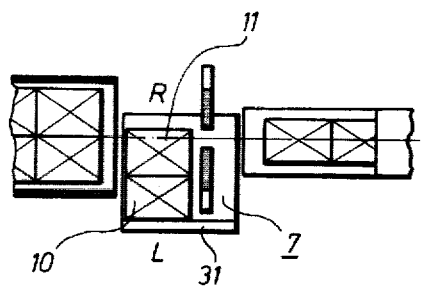

In FIGS. 7g, the transverse table 7 has been moved to the side in the direction L by the distance s, so that the bale 10 bearing against the stop 31 has been pressed on to the bale 11, the gap s being eliminated.

Figure 7H:
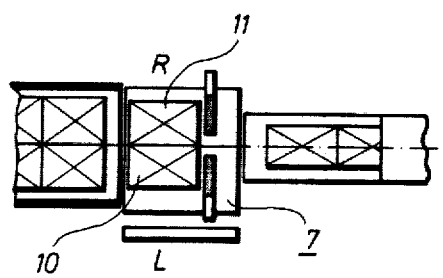

In FIG. 7h, the transverse table 7 has already been moved back again toward the side R sufficiently far for the pair of bales 10 and 11 to be in alignment with the transport vehicle in position for pushing them on to the vehicle.

Figure 7I:
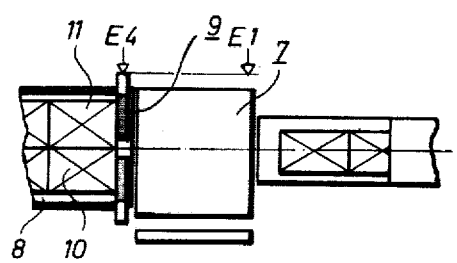

Finally, as shown in FIG. 7i, the hauling tongs 9 have pushed the pair of bales 10, 11 on to the vehicle 8 and have thus pushed all the bales situated on the vehicle forwards by one bale length. At the limit switch E4, the hauling tongs 9 have reached their limiting position. The tongs now travel back into the limit switch position E1, in which a new cycle of operation begins.

We claim:

1. Apparatus for loading on to a transport vehicle bales of waste material which have been ejected from the discharge opening of horizontally acting baling press, said apparatus being arranged to be disposed adjacent said discharge opening of said press and comprising, located in succession, a horizontal rectilinear discharge table adjacent said opening and aligned with the discharge opening so that the bales of waste material move along said discharge table in the discharge direction out of the baling press, said discharge table having a first end adjacent the discharge opening from the baling press and a second end remote from the discharge opening, said discharge table haing a vertical central plane extending longitudinally from the first end to the second end thereof with the central plane being equidistantly spaced from the sides of said discharge table, a transverse table adjacent the second end of said discharge table, drive means for displacing said transverse table horizontally and perpendicularly to the vertical central plane of said discharge table with said transverse table being located approximately in the same horizontal plane as said discharge table, hauling tongs, means mounting said hauling tongs for movement in the horizontal direction along said vertical central plane and with said tongs being disposed symmetrically on opposite sides of said plane, and said means arranged to move said tongs for selectively engaging a single bale for movement from said discharge table to said transverse table to form in cooperation with said drive means for said transverse table a pair of the bales in side-by-side relation on said transverse table with the contacting sides of the pair of the bales being located in the vertical central plane and also to move said tongs over said transverse table for displacing the pair of the bales thereon from the opposite side of said transverse table from the second end of said discharge table onto the transport vehicle in an extension of the direction between the first and second ends of said discharge table and for displacing any previously displaced pairs of the bales located on the transport vehicle in a continuation of the direction between the first and second ends.

2. Apparatus as claimed in claim 1, wherein said hauling tongs comprises two upright jaws, and said means mounting said hauling tongs arranged for moving said jaws in a direction parallel to said longitudinal vertical central plane and for moving said jaws toward and away from each other on the opposite sides of the vertical central plane whereby the horizontal spacing of said jaws can be varied between a dimension exceeding the width of one of said bales and a dimension less than said width.

3. Apparatus as claimed in claim 1, wherein said transverse table comprises first and second half-tables, means for mounting said half-tables alongside one another for movement perpendicularly to said longitudinal vertical central plane, means for hingedly connecting said first half-table to said second half-table for upward and downward tilting movement of said second half table relative to said first half-table, first track means supporting said first half-table and second track means supporting said second half-table, said half-tables being movable on said track means between a first position in which said first half-table is in alignment with said discharge table and a second position in which said second half-table is in alignment with said discharge table, said first track means being horizontal and said second track means comprising a first track section which is horizontal and a second track section which is inclinded, said second half-table moving horizontally between said first position and said second position on said first track section and said second half-table being movable to a third position in which said second half-table runs on said second track section and said second half-table is downwardly tilted to discharge a bale thereon.

* * * * *